Patented Apr. 22, 1952

2,593,566

UNITED STATES PATENT OFFICE 2,593,566

METHOD AND COMPOSITION FOR COLORING EGGS

Harry Frank Kamp, Cincinnati, Ohio

No Drawing. Application January 29, 1949,
Serial No. 73,667

9 Claims. (Cl. 106—129)

This invention relates to improvements in a method and composition for coloring hard boiled eggs and the like.

The coloring of hard boiled eggs for use at Easter is a practice of long standing. In the past the coloring of the eggs consisted either in dying the shell or of applying an oil paint or other surface covering and which coverings had primarily other uses. In the use of dyes, it frequently penetrated beneath the shell, while in using oil paints and other surface covering materials considerable difficulty and time was required to permit said covering to harden and before the colored eggs could be handled. The method and means for coloring eggs of the present invention obviates the disadvantages of the above mentioned previous methods.

The principal object of the present invention is the provision of an egg coloring material that can be readily prepared and applied to the egg with a minimum of effort by all persons with equal success.

Another object of this invention is the provision of an egg coloring material that while it fully and completely covers the egg shell does not penetrate below the shell to the egg itself.

A further object of this invention is the provision of a method for coloring eggs that is simple in operation and can be practiced by persons of all ages capable of using a slight amount of care.

A still further object of this invention is the provision of an egg coloring material that can be placed on the market in simple form and made up at home with a minimum of effort and with the assurance that uniform results will be obtained in the use of the prepared egg coloring material.

Other objects and advantages of the present invention should be readily understood from the following specification and it is to be understood that modifications may be made within the purview of the appended claims.

The egg coloring material of the present invention contemplates the use of granulated or powdered gelatine in combination with water soluble certified vegetable colors or water soluble mineral pigment. These ingredients are mixed together in dry comminuted form to be subsequently dissolved in water. It has been found that gum arabic and/or gum tragacanth may be added to the gelatine and coloring ingredient for the purpose of delaying the drying out of the, as will later be made clear, gelled coloring material as will presently be described.

The composition of gelatine, coloring ingredient and gum, as noted above, are mixed together in powdered form and then dissolved in hot water. The amount of water to be used is somewhat less than that employed with gelatine or gelatine mixes that are prepared as foods so that the resultant gelatinous mass is denser than the food mass. After the ingredients have been dissolved, the mixture is allowed to cool or congeal at which time, and as noted above, a gelatinous mass results that is denser in body texture than the gelatinous mass resulting from gelatine or gelatine mixes that are employed as foods.

After the egg coloring material has gelled, hot, clean, hard boiled eggs are employed and the coloring thereof is done by placing the said hot egg on the gelatinous mass and the egg turned or moved while in contact with said gelatinous mass. The hot egg causes a melting of the gelatinous mass which is picked up by the egg, due to the inherent stickiness of the gelatine, and which stickiness is augmented by the gums, and as the egg is rolled or moved a surface covering is given to the egg. It will be understood that a plurality of gelatinous masses, each of a different color, may be employed and that the egg may have different portions of its surface brought into contact with the differently colored gelatinous masses thereby giving to the egg a multi-color surface.

It will be appreciated that the color surface on the egg is relatively soft and inclined to run immediately after the egg is removed from the gelatinous mass and in order to prevent the sticking of the egg, through its coloring layer to a supporting surface, it is advisable to place the egg on greased paper or a greasy surface to which the gelatine covering of the egg will not readily adhere so that the coloring will remain on the egg and be readily separated from the support after the egg has cooled sufficiently that it can be handled and the coloring has dried and hardened. It should be noted that the coloring layer is quite thin wherefore the said layer will very rapidly harden on the egg so that the egg may be handled within a short time after it has been colored. It should be noted that after the egg has cooled the coloring layer tenaciously adheres to the egg shell and cannot be wiped or rubbed off and is perfectly hard and dry.

The proportion of gelatine to the coloring matter may vary within fairly wide limits depending upon whether the deep colors or the pale colors are being employed and depending upon the intensity of any particular shade or color desired. It has been found that one hundred pounds of granulated gelatine may be employed with from approximately two and three-fourths pounds to five and one-half pounds of powdered coloring material, whether of the certified vegetable colors or the mineral pigments. These ingredients are thoroughly mixed. The mixture of gelatine and color or pigment may then be subdivided into quantities of approximately one-eighth ounce of mixed powdered or granulated material. The mixed powdered or granulated material is then dissolved in a tablespoon, or one-half ounce, of water and the dissolved mixture or solution allowed to set into a gelatinous mass. The gelatinous mass is then used as above set forth in connection with hot, clean, hard boiled eggs or the like.

The colors that may be added to the mixture, either in the form of water soluble certified vegetable color or water soluble mineral pigment, may include yellow, orange, blue, green, red and purple or any of the other colors or shades of colors that may be desired and are commercially obtainable.

To the above specific mixture may be added approximately nine pounds of gum, such as, as mentioned above, gum arabic or gum tragacanth, preferably, there should be added four and one-half pounds of each to the one hundred pounds of granulated gelatine. Either of these gums will prevent the gelled mass from too rapidly drying out in the event the gelled mass is not used within a short time after being made. It is to be understood that the proportion or amount of gum may be varied depending upon how long the gelled mass is desired to stand before being completely used up.

It has been found that when one-eighth ounce of the powdered mixture is dissolved in a tablespoon, or one-half ounce, of water a sufficient quantity of gelled coloring material will result to color approximately one dozen eggs.

In the use of the coloring material of the present invention it is contemplated to use a relatively shallow container of a length and width to conveniently receive an egg while permitting the same to be rolled or manipulated and moved on the top surface of the gelled mass so that the entire surface of the egg may be brought into contact with the surface of the gelled coloring material to thereby produce a uniform color layer on the entire egg shell. It is also contemplated that the egg may be colored by merely picking up some color material on an end or some other portion thereof and then working the coloring material while in its relatively fluid state over the egg surface either by means of the fingers or an appropriate spreading implement. In this way various colors may be intermixed on the surface of the egg to provide a marbleized or mottled effect instead of a completely uniform layer of color.

From the foregoing it will be noted that the coloring material of the present invention does not dye the egg shell nor will it penetrate the shell to the egg itself, while at the same time the coloring material is such that no permanent stain results on either the hands or any other material that it may come in contact with since the coloring material is water soluble and can readily be rinsed or washed away.

With the use of certified vegetable colors no danger results even though some of the coloring materials should get beneath the egg shell through cracks or the like, that sometime result in boiling, since all ingredients in the coloring material would then be edible and in no wise harm a human being.

What is claimed is:

1. A coloring material for eggs consisting entirely of in proportion approximately one-hundred pounds of granulated gelatine, approximately two and three-fourths to five and one-half pounds of a coloring material selected from the group consisting of a certified vegetable and mineral pigment coloring ingredient in powdered form, and approximately nine pounds of gum selected from the group consisting of gum arabic and gum tragacanth in comminuted form.

2. An egg coloring composition consisting entirely of in proportion approximately one-hundred pounds of comminuted gelatine and approximately two and three-fourths to five and one-half pounds of a color ingredient in dry form thoroughly mixed.

3. An egg coloring material consisting entirely of in proportion approximately one-hundred pounds of comminuted gelatine and approximately two and three-fourths to five and one-half pounds of a certified vegetable color in dry form thoroughly mixed.

4. An egg coloring material consisting entirely of in proportion approximately one-hundred pounds of comminuted gelatine and approximately two and three-fourths to five and one-half pounds of a mineral pigment in dry form thoroughly mixed.

5. An egg coloring material consisting entirely of in proportion approximately one-hundred pounds of comminuted gelatine, approximately two and three-fourths to five and one-half pounds of a comminuted water soluble color, and approximately nine pounds of a comminuted gum in the form of gum arabic and gum tragacanth.

6. The method of coloring eggs comprising one part by weight of a dry mixture consisting entirely of in proportion approximately one-hundred pounds of comminuted gelatine and approximately two and three-fourths to five and one-half pounds of a water soluble color ingredient dissolved in water approximately four times the weight of the dry mixture and hot enough to dissolve the same, allowing the solution to cool and gell, and making contact between the shell of the hot egg and gelled coloring mass.

7. The method of coloring hot hard boiled eggs comprising bringing the surface of the hot egg into contact with a gelled coloring material which prior to its gelatinization consisted of a quantity of dry powder of in proportion approximately one-hundred pounds of comminuted gelatine, two and three-fourths to five and one-half pounds of a coloring material, and approximately nine pounds of gum that had been dissolved in water of approximately four times the weight of the dry powder.

8. The method of coloring hot hard boiled eggs comprising bringing the surface of the hot egg into contact with a gelled coloring material which prior to its gelatinization consisted of a quantity of dry powder of in proportion approximately one-hundred pounds of comminuted gelatine, two and three-fourths to five and one-half pounds of a certified coloring material, and approximately nine pounds of gum that had been dissolved in water of approximately four times the weight of the dry powder.

9. The method of coloring hot hard boiled eggs comprising bringing the surface of the hot egg into contact with a gelled coloring material which prior to its gelatinization consisted of a quantity of dry powder of in proportion approximately one-hundred pounds of comminuted gelatine, two and three-fourths to five and one-half pounds of a mineral pigment, and approximately nine pounds of gum that had been dissolved in water of approximately four times the weight of the dry powder.

HARRY FRANK KAMP.

REFERENCES CITED

The following references are of record in the file of this patent:

UNITED STATES PATENTS

| Number | Name | Date |
| --- | --- | --- |
| 279,492 | Meucci et al. | June 12, 1883 |
| 432,151 | Swenning | July 15, 1890 |
| 452,583 | Rosenfeld | May 19, 1891 |
| 1,829,645 | Gibbens | Oct. 27, 1931 |
| 2,468,443 | Humphner | Apr. 26, 1949 |